United States Patent [19] [11] 3,845,887
Meuresch et al. [45] Nov. 5, 1974

[54] PRESSURIZED AEROSOL DISPENSER VALVE AND GASKET

[75] Inventors: Herbert Meuresch, Falkenstein, Taunus; Franz Zimmerhackel, Hattersheim, Main, both of Germany

[73] Assignee: Precision Valve Corporation, Yonkers, N.Y.

[22] Filed: Dec. 13, 1972

[21] Appl. No.: 314,604

[30] Foreign Application Priority Data
Dec. 17, 1971 Germany.............................. 2162762

[52] U.S. Cl............................. 222/402.16, 251/354
[51] Int. Cl............................................ B05b 1/10
[58] Field of Search....... 222/402.1, 402.16–402.25, 222/518; 251/341, 347, 348, 349, 353, 354; 141/20, 3

[56] References Cited
UNITED STATES PATENTS
2,755,973  7/1956  Campbell....................... 222/402.25
3,036,743  5/1962  Rhodes........................... 222/402.16

Primary Examiner—Robert B. Reeves
Assistant Examiner—Thomas E. Kocovsky
Attorney, Agent, or Firm—Davis, Hoxie, Faithfull & Hapgood

[57] ABSTRACT

The resilient annular sealing gasket for a valve of a pressurized aerosol dispenser is formed with a polygonal periphery to provide a plurality of pressure filling passages within the valve mounting cup pedestal and exterior to the valve housing for more rapid filling of the dispenser with propellant when the valve is in place and for more economical utilization of the elastomeric material from which the sealing gaskets are manufactured.

6 Claims, 7 Drawing Figures

PATENTED NOV 5 1974 3,845,887

PRESSURIZED AEROSOL DISPENSER VALVE AND GASKET

This invention relates to a valve for a pressurized aerosol dispenser and more particularly relates to a generally polygonal gasket for such a valve to permit rapid filling of the dispenser with propellant and to more economically utilize the elastomeric material from which the gasket is manufactured.

Aerosol dispenser valves of the general type shown in U.S. Pat. No. 2,631,814 to R. H. Abplanalp employ an annular elastomeric gasket which encircles the valve stem of the movable valve member such that the valve orifice of the movable valve member is blocked by the inner margin of the annular gasket when the valve is closed. The annular gasket is clamped between the upper edge of the valve housing and the inner surface of the top wall of a pedestal portion of the valve mounting cup. The valve stem protrudes through an aperture in the top wall. Heretofore such gaskets have had circular outer peripheries which correspond approximately to the diameter of the circular top wall of the pedestal portion of the valve mounting cup. The valve housing is affixed within the pedestal portion of the mounting cup pedestal portion by deformation of the sheet metal of the valve mounting cup as by crimping. The metal deformation forces the upper rim of the valve housing against the underside of the annular resilient gasket.

One method of charging dispensers equipped with known valves of the type above described is to seal a propellant charging head against the valve mounting cup to include at least the top end wall of the valve mounting cup pedestal portion and the upstanding valve stem with or without an actuating button within the charging head. The charging head usually includes means to depress the valve stem to open the valve to establish a first path leading to the interior of the dispenser for charging the dispenser with propellant under pressure. Sufficient clearance exists between the valve stem and the valve stem aperture in the valve mounting cup pedestal top wall to provide an annular passage outside the valve stem for the charging of the container with propellant. The pressure of the propellant deflects the inner margin of the sealing gasket away from the valve stem to provide a second path for propellant to enter the container. Both of these paths require that the entering propellant pass through the valve housing and the product eduction or dip tube.

It is desirable that further paths for propellant charging purposes be established to decrease the time required to charge dispensers with propellant. It is further desirable that such additional propellant charging paths circumvent the valve housing to allow for more rapid filling. Prior efforts to accomplish these desires are disclosed in U.S. Pat. Nos. 3,158,297 and 3,357,957.

The present invention provides for additional propellant charging paths leading from the valve stem aperture of the mounting cup pedestal to the interior of the dispenser exteriorly of the valve housing. This is accomplished according to the present invention by forming the outer periphery of the sealing gasket in a generally polygonal shape such that each side constitutes a chord or secant of the circle defined by the cylindrical mounting cup pedestal portion to provide openings between the periphery of the sealing gasket and the inner wall of the cylindrical mounting cup pedestal portion. These openings paths for propellant flowing across the top of the sealing gasket to enter the dispenser container outside the valve housing. Such polygonal periphery sealing gaskets can be cut or stamped from sheet material with less wasted material than is the case with circular gaskets.

The invention will be further explained with reference to the drawings in which

Figure 1:
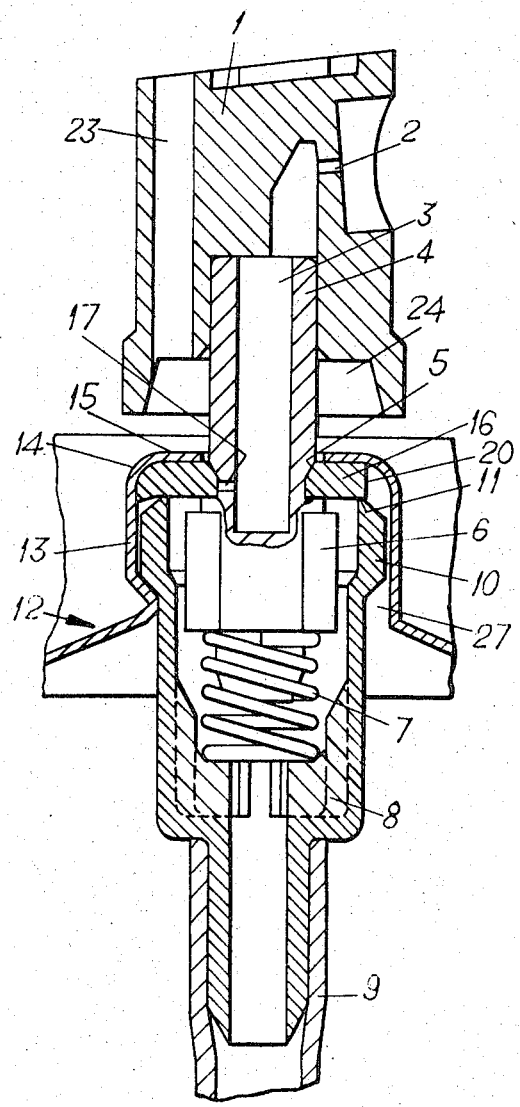
FIG. 1 is an elevational view in section of a valve according to the present invention including a portion of the valve mounting cup and dip tube along with an actuator button.

Referring now to FIG. 1, a valve according to the present invention is provided with a dispensing actuator button 1 having a discharge orifice 2 in communication with the bore 3 of the hollow upstanding valve stem 4 upon which the button is frictionally retained. The valve stem 4 is an integral portion of the movable valve body 6. Valve body 6 is contained within a valve housing 8 and is biased towards closure by a helical spring 7. The valving function is accomplished by the blockage of valve orifice 17 in a constricted neck 5 by the inner margin hole 18 in the center of the resilient elastomeric sealing gasket 16. The sealing gasket 16 encircles neck portion 5 below the stem portion 4 of the movable valve body 6. The valve structure is carried by a valve mounting cup 12 which forms an end closure for the container of a pressurized aerosol dispenser. The valve assembly is accommodated in a valve mounting pedestal portion 13 of generally cylindrical shape located centrally of the valve mounting cup 12. The valve mounting pedestal portion includes a top end wall 15 having an aperture 22 which permits the valve stem 4 of the valve assembly to protrude. The aperture 22 is somewhat larger in diameter than the exterior diameter of the stem portion 4. The valve assembly is held in the valve mounting cup pedestal portion 13 by means of a plurality of inwardly extending deformations or crimps formed in the sheet metal of the valve mounting cup 12. The crimps are formed below an annular flange 10 on the valve housing 8. The crimping operation holds the rim 11 of the valve housing 8 against the undersurface of the resilient sealing gasket 16 to capture and compress the gasket between the end wall 15 of the valve mounting cup pedestal portion 13 and the rim 11 of the valve housing 8. A produce eduction or dip tube 9 is fitted to the lower end of the valve housing to convey product under pressure to the valve assembly.

Figure 2:
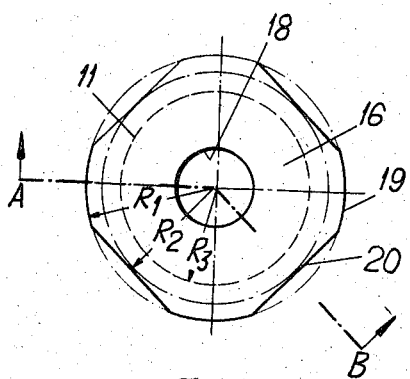
FIG. 2 is a plan view of a sealing gasket appropriate for use in the valve of FIG. 1.

FIG. 2 illustrated a preferred form of resilient sealing gasket 16 for use in the valve assembly of FIG. 1. The line A-B in FIG. 2 represents the orientation of the section of the gasket shown in FIG. 1. A circular aperture 18 forms the inner margin of the gasket and is the portion of the gasket which encircles and blocks the valve orifice 17 of the movable valve body 6. A concentric circle 19 forms parts of the outer periphery of the gasket. The remaining parts of the outer periphery of the gasket are formed by chords or secants 20 which are arranged on a square. A circle having a radius $R_3$ is shown in broken lines and corresponds to the diameter of the clamping rim 11 of the valve housing 8. The outer periphery of the gasket thus has portions at a radius $R_1$ which corresponds to the radius of the interior of the cylindrical portion of the valve mounting pedestal 13 of the valve mounting cup 12. Secants 20 result in portions of the outer periphery of the gasket lying at a smaller radius $R_2$ which radius is larger than the clamping rim radius $R_3$.

Figure 3:
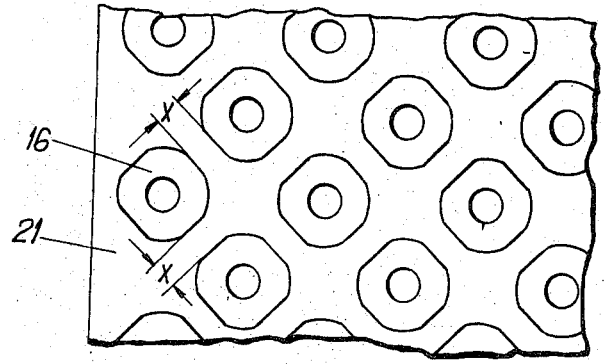
FIG. 3 illustrates the layout of sealing gaskets of the configuration shown in FIG. 2 on a sheet of raw material from which the gaskets are to be cut.

FIG. 3 shows the distribution of gaskets 16 of the configuration of FIG. 2 to be stamped out of a sheet 21 of raw material. Because of the shape of the gaskets, the minimum spacing X to be maintained results in less wasted material than the maintenance of the same minimum spacing X between circular gaskets.

Figure 4:
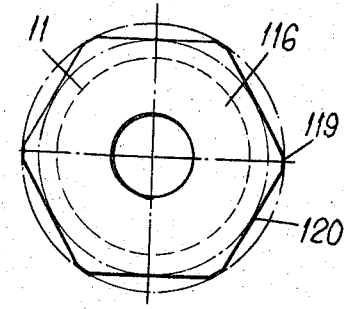
FIG. 4 is a plan view of another configuration of sealing gasket appropriate for use in the valve of FIG. 1.

FIG. 4 shows a further embodiment of the sealing gasket 116 which consists of short circular sections 119 and secants 120, the secants being arranged on a regular hexagon. The relationship among the various radii is substantially similar to that described in connection with FIG. 2.

Figure 5:
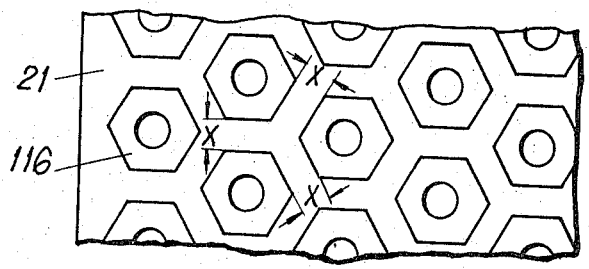
FIG. 5 illustrates the layout of sealing gaskets of the configuration of FIG. 4 on a sheet of raw material from which the gaskets are to be cut.

FIG. 5 shows the distribution of gaskets of the configuration of FIG. 4 on a sheet of material 21. The distribution maintains the same minimum spacing as described in connection with FIG. 3. With this embodiment even greater savings of material can be realized than with the distribution of FIG. 3.

Figure 6:
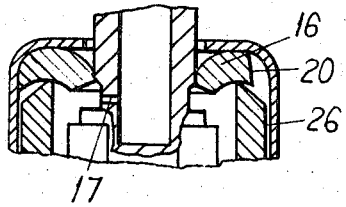
FIG. 6 is an elevational view in section of a portion of the valve of FIG. 1 showing the disposition of valve parts during dispensing actuation of the valve.

FIG. 6 illustrates the valve assembly of FIG. 1 in the position assumed during normal actuation by pressing down on the actuating dispenser button 1. The inner margin of the sealing gasket 16 is deflected downwardly and away from the valve orifice 17. Product under the pressure of propellant can then flow up the dip tube 9 into the valve housing 8, through the valve orifice 17 into the bore 3 of the valve stem 4 and thence out of discharge orifice 2 in the actuator button 1.

Figure 7:
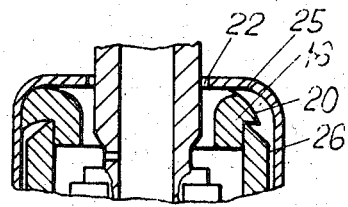
FIG. 7 is an elevational view in section of a portion of the valve of FIG. 1 showing the disposition of valve parts as the dispenser is being filled with propellant under pressure.

FIG. 7 illustrates the disposition of the valve parts during filling of the dispenser with propellant. As before stated, the valve structure of the present invention permits more rapid charging of the dispenser with propellant. Propellant passes not only through the bore 3 of the valve stem 4 and into the container, but also through the annular aperture 22 in the end wall 15 of the valve mounting cup pedestal portion 13. Since the propellant is under considerable pressure, the sealing gasket 16 is deformed and deflected away from the valve stem 4 to provide a passage outside the valve stem into the interior of the valve housing 8. In addition, the gasket experiences considerable stretching. It can be seen in FIG. 7 that a passage channel 25 between the upper surface of the gasket 16 and the end wall 15 of the valve mounting cup pedestal portion 13 occurs in the region adjacent the secant portions 20 of the outer periphery of the gasket along paths corresponding to radii $R_2$ in FIG. 2. The propellant flowing through channels 25 passes downwardly between the exterior of the valve housing 8 and the interior of the valve mounting cup pedestal portion 13 through clearance space 26 normally present between the flange 10 of the valve housing 8 and the metal of the valve mounting cup. This propellant then flows directly into the container outside the valve unit through interruptions 27 between the crimps which hold the valve unit in the valve mounting cup. When the filling process has been completed, the gasket returns and seats against the end wall 15 to reassume the position of the gasket 16 shown in FIG. 1. The internal pressure of the container assists in forcing the gasket 16 against the end wall 15 thereby assuring a leak proof seal.

The additional paths for propellant under pressure afforded by passages 25 corresponding to secants 20 of the polygonal configuration gasket permits more rapid filling of the dispenser with propellant. Further, these additional propellant paths reduce the possibility that the interior of the valve housing will experience internal pressures approaching the supply pressure of the propellant as may be the case where all of the propellant must pass through the valve housing. These high pressures can lead to damage or destruction of the valve. The filling paths established by the present invention are exterior of the valve housing and lead directly to the container.

Since the smallest radius $R_2$ corresponding to a secant 20 is larger than the radius $R_3$ of the clamping ring 11, it is insured that variations in the outer periphery will not affect the clamping of the gasket by the clamping rim 11 of the valve housing. Also the portions of the periphery between the secants are sufficient for accurate centering of the gasket in the mounting cup pedestal.

Although the present invention has been described in terms of a polygonal gasket having flat sides which lie along secants, it is apparent that other peripheral shapes could be employed. The outer periphery of the gasket can be castellated, scalloped or undulous. It is only necessary that one or more portions of the periphery of the gasket extend to the circumference of the interior of the valve mounting pedestal portion. The remaining portion or portions of the periphery of the gasket must extend beyond radius $R_3$ of the clamping rim 11 to assure sealing, but must terminate short of the circumference of the interior of the valve mounting pedestal portion. Those portions need not lie along straight lines, but can be curved or irregular.

What is claimed is:

1. A pressurized dispenser carrying a valve capable of normal use as a discharge valve and of additional use as a propellant charging valve, said valve comprising a valve housing having an upper rim, a valve body within said valve housing and having a valve stem, and an apertured sealing gasket which surrounds the valve stem which gasket is clamped and forms a seal between the upper rim of the valve housing and an adjacent part of the dispenser in which the valve is mounted, said gasket having a non-circular periphery which everywhere extends radially beyond the upper rim of the valve housing to provide one or more marginal zones having reduced sealing engagement with said adjacent part of the dispenser such that when charging the dispenser with propellant each of said marginal zones is deformed and removed from its sealing relation with the said adjacent part of the dispenser to provide a propellant inlet passage leading to the dispenser externally of the valve housing.

2. The improvement of claim 1 wherein the outer periphery of the valve gasket is at least partially defined by chords of the circle defined by the cylindrical wall of the valve mounting cup pedestal portion.

3. The improvement of claim 1 wherein the outer periphery of the valve gasket is polygonal.

4. A dispenser according to claim 1, wherein the outer periphery of the sealing gasket has a generally polygonal shape such that each side constitutes a chord or secant of the circle defined by the inner peripheral wall of a cylindrical valve mounting cup pedestal portion of the dispenser, thereby providing gaps between the periphery of the sealing gasket and said peripheral wall.

5. A dispenser according to claim 4, wherein said chords are arranged in oppositely disposed pairs.

6. In a pressurized aerosol dispenser including a container having a dispensing valve unit mounted in a cylindrical valve mounting pedestal portion of the container and a discharge conduit extending through an aperture in an end wall of the pedestal portion, the valve unit including a movable valve member within a valve housing having an annular upper rim and a valve sealing gasket having a central aperture encompassing the discharge conduit, said gasket being clamped between said upper rim and said end wall; the improvement which comprises a non-circular configuration of the outer periphery of the gasket, the radius of a circle circumscribing the greatest radial extent of the gasket periphery being at least as large as the radius of the interior of said cylindrical valve mounting pedestal portion, the radius of a circle circumscribing the least radial extent of the gasket periphery being larger than the radius of the clamping rim of the valve housing.

* * * * *

UNITED STATES PATENT OFFICE
CERTIFICATE OF CORRECTION

Patent No. 3,845,887           Dated November 5, 1974

Inventor(s) Herbert Meuresch and Franz Zimmerhackel

It is certified that error appears in the above-identified patent and that said Letters Patent are hereby corrected as shown below:

Col. 1, line 55; "3,357,957" should be --3,375,957--.

Col. 1, line 68; after "openings" insert --provide--.

Col. 2, line 63; "produce" should be --product--.

Col. 2, line 65; "illustrated" should be --illustrates--.

Signed and sealed this 1st day of April 1975.

(SEAL)
Attest:

RUTH C. MASON
Attesting Officer

C. MARSHALL DANN
Commissioner of Patents
and Trademarks